May 19, 1925.
L. V. SLAIGHT
1,538,009
SPEED CONTROLLING DEVICE FOR MOTOR VEHICLES
Filed May 1, 1920
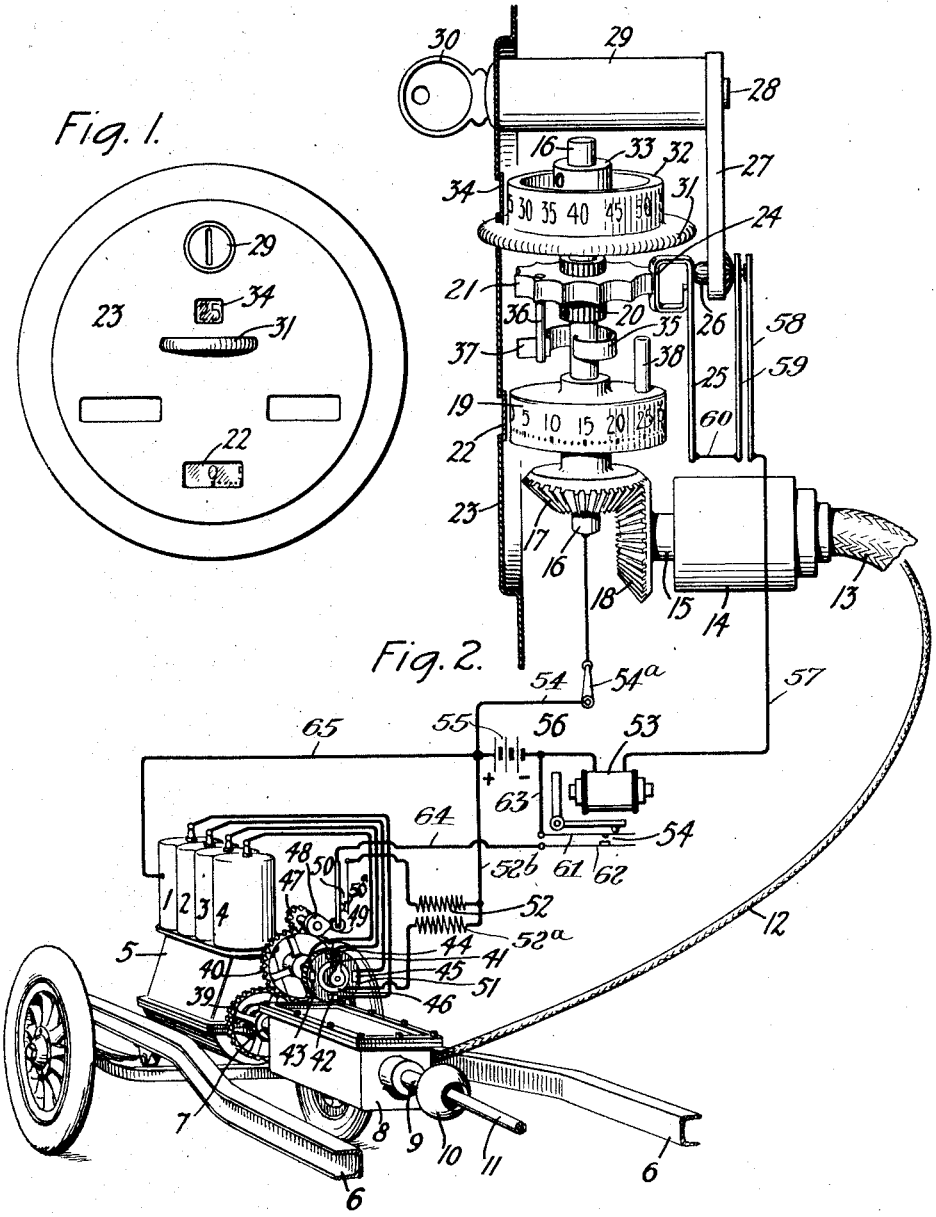
Inventor:
Leland V. Slaight
by Frederick ? Church
his Atty.

Patented May 19, 1925.

1,538,009

UNITED STATES PATENT OFFICE.

LELAND V. SLAIGHT, OF CLEVELAND HEIGHTS VILLAGE, OHIO.

SPEED-CONTROLLING DEVICE FOR MOTOR VEHICLES.

Application filed May 1, 1920. Serial No. 378,134.

*To all whom it may concern:*

Be it known that I, LELAND V. SLAIGHT, a citizen of the United States, residing at Cleveland Heights Village, in the county of Cuyahoga, State of Ohio, and whose post-office address is 12412 Cedar Road, have invented certain new and useful Improvements in Speed-Controlling Devices for Motor Vehicles, of which the following is a specification.

This invention relates to means for controlling the speed of motor vehicles, and more particularly to such devices as are adapted for use with vehicles propelled by internal combustion motors, and it has for its object to provide a simple, economically constructed mechanism which may be readily attached to a vehicle and may be adjusted, or "set" to definitely limit the maximum speed, or rate of travel of such vehicle.

A further object of the invention is to provide an instrument which, in addition to indicating the speed of a motor-driven vehicle, embodies means which may be readily adjusted to indicate such selected limit of speed and will thereafter function to prevent the speed at which the vehicle is driven from exceeding the desired limit.

Another object of the invention is to provide an apparatus of this character which is capable of being locked in its position of adjustment by the owner of the vehicle and is secure against interference by a chauffeur, or unauthorized persons.

To these and other ends, my invention consists in certain improvements and arrangements of parts, all as will be more fully described hereinafter, the novel features being set forth in the claims forming part of this specification.

In the drawings Fig. 1 is a front elevation illustrating the face plate of a device comprising the preferred embodiment of my invention; and Fig. 2 is a perspective view of those portions of a motor vehicle and of the speed-controlling mechanism necessary to an understanding of the invention, the ignition and control circuits being shown diagrammatically.

In the present embodiment of the invention, the maximum speed of a motor vehicle which is predetermined, is limited by automatically opening the ignition circuit of the motor when the vehicle has attained the selected limit of speed, and by maintaining said circuit open until the speed is lessened or falls below the predetermined limit.

The ignition circuit is controlled through spring contacts which are closed by a relay and retained closed while the rate of travel of the vehicle is less than or below the selected speed limit. When the limiting speed is attained, the relay circuit is interrupted, allowing its contacts to be opened, thereby interrupting the ignition circuit of the motor, thus preventing further increasing the speed of the vehicle.

Referring particularly to Fig. 2, there is shown an internal combustion motor comprising the cylinders 1, 2, 3 and 4 mounted on the crank case 5 carried by the chassis, represented by the frame members 6, in any well-known manner. The crank shaft 7 is connected through a clutch (not shown) with the transmission gears enclosed within the box 8, from the rear end of which extends the driving shaft 9, which, it will be understood, transmits the power to the driving wheels of the vehicle. As is well known to those skilled in the art, the speed of the vehicle varies directly with the speed of rotation of the drive shaft 9. The controlling device is preferably located in front of the driver's seat and between it and some driven part of the vehicle is a flexible shaft 12 which, in the present instance, leads at its lower end to the box 8 where it is geared in any suitable manner to the drive shaft 9, and may be enclosed in a protecting tube or sheath 13. It will thus be seen that the shaft 12 has an angular velocity proportional to the speed of the vehicle. Within the case 14 is contained mechanism driven by the shaft 12 which converts the rotation of the shaft 12 into an angular displacement of a shaft 15, which varies in direct proportion to the speed of rotation of the shaft 12 and thus to the speed of the vehicle. This converting mechanism may be of any preferred construction, such as the magnetic or centrifugal type utilized to actuate a speed-indicating drum 19 provided, as shown, with suitable graduations for indicating the rate of travel in miles per hour.

Extending angularly, preferably in a vertical direction in front of the shaft 15 is a rod 16 rotatably mounted in suitable bearings (not shown), and carrying at its lower end a freely revolving bevel gear 17 meshing with the bevel gear 18 attached to the end of shaft 15. The drum 19, before referred to, is mounted on the gear 17 and is rotated in one direction, or advanced as the rate of travel of the vehicle increases to display its indices in a window 22 in the face plate 23. The speed-regulating devices are arranged for convenience on the shaft 16 and cooperate with the drum 19, whereby when the latter reaches the indicating point for the maximum speed, the vehicle is to attain the source of current for the ignition system of the engine will be cut off. This is accomplished, in the present embodiment of the invention, as follows:

A disc 21 is attached to the rod 16 and insulated therefrom by a washer 20 and is provided in its periphery with recesses which cooperate with a projection 24 on the end of a contact spring 25, formed by looping the end of the spring as shown, for the purpose of holding the rod 16 against rotation after the disc has been adjusted, the contact spring itself being normally held against displacement by an insulating lug 26 at the lower end of an arm 27 which is adjustable into and out of engagement with the spring. The arm 27 is carried by the rotary barrel 28 of a key lock 29, the construction of the latter being such that the key 30 may be removed from the lock either when the lug 26 is in position to lock the disc 21 against rotation, or when arm 27 has been rotated to one side to move lug 26 out of engagement with spring 25.

An indicating-setting-member is mounted on the shaft 16 and secured thereto, comprising a disc 31 having a hub 33 and an annular ring 32, graduated and numbered so that it may be set to show, through a window 34, the selected, or set, limit of speed which the motor vehicle is not to exceed. The edge of the disc 31 is knurled and projects through a slot in the face plate 23 to enable it to be easily manipulated by the fingers. Thus the rod 16 may be set by rotating the disc 31 when the arm 27 is moved by the insertion of the key 30 in the lock 29, but is secure against interference when said arm is locked in the position shown in the drawing. A spiral spring 35, rigidly secured to rod 16, normally holds its radially extending bearing surface 37 in contact with a pin 36 projecting from the lower side of disc 21 and the controlling circuit, as will be further explained, extends through the spring and pin so when the former is moved away from the latter, the circuit will be opened, or disrupted. A pin 38 projects from the upper surface of drum 19 and is set at a slightly greater radial distance from rod 16 than the pin 36, so that a clockwise rotation of drum 19 will cause pin 38 to engage the bearing surface 37 of spiral spring 35 when the speed of the vehicle causes the drum 19 to be advanced to the point where the reading displayed is equal to that on ring 32. If the drum 19 is then caused to rotate further, the pressure of pin 38 against the end of the spring will force its contact surface 37 away from its cooperating contact pin 36, thereby interrupting the controlling circuit.

The ignition system by means of which the gas charges in the engine cylinders are ignited in the proper sequence in the several cylinders, is shown somewhat schematically to simplify the drawing. A gear wheel 39 carried by the engine crank shaft 7 drives a second gear wheel 40, the shaft of which carries a brush 41 which makes a complete revolution for each two revolutions of the crank shaft and serves to successively connect conducting segments 42, 43, 44 and 45 with the conducting ring 46. The conducting segments and ring, constituting the distributor, are set in an insulating block 51 which is rigidly mounted in any suitable manner. The gear wheel 40 also drives a pinion 47, which rotates a cam 48 into engagement with roller 49, controlling one of a pair of contact members 50, 50$^a$, whereby the latter are momentarily closed each time that brush 41 is in engagement with one of the conducting segments 41, 42, 43 or 44 of the distributor. Thus each time the secondary circuit of the transformer, through the winding 52$^a$, is completed, its primary circuit, through the coil 52, will normally be momentarily completed, unless some portion of the ignition circuit is disrupted by the disengagement of the spring 35 from the pin 36 by reason of the excessive speed of the vehicle.

In practice, instead of leading the part of the ignition circuit extending between the engine and the distributor, or the part between the battery and the distributor, through the spring and pin contacts 35, 36, as might readily be done, I prefer to utilize these contacts for a secondary control circuit which is provided with a slow-operating or sluggish relay which is normally energized to maintain the ignition circuit in operative condition. There is a special advantage in this arrangement as the relay which is made sluggish in its action by surrounding its core with a copper sleeve, has a short time constant and will hold its contacts closed against short momentary breaks of its circuit, as may occur by an acceleration of the vehicle when at or near its "set" or maximum speed from causes not due to engine speed. Then, too, the relay being sluggish is not affected by sudden jars or the usual vibrations imparted to the vehicle.

The slow-operating relay, indicated by 53, is arranged in the controlling circuit comprising conductor 54 leading from one terminal of the source of power, or battery 55, to shaft 16, wire 56 leading from the other terminal of the battery to one of the relay terminals, and conductor 57 extending from the other terminal of the relay to one of a pair of contact springs 58, 59. The spring 59 is connected in circuit with the spring finger 25, as by a wire 60. This pair of springs is mounted in position to be controlled by the arm 27 of the lock 29, so that when the arm 27 is in position to engage the spring finger 25 the insulated stud 26 thereon will also press the springs 58 and 59 together. When the vehicle is to be left unattended the ignition circuit may be rendered inoperative by rotating the arm 27, through the medium of the lock 29, or an auxiliary switch 54ª may be provided for this special purpose if desired. On the other hand, when the arm 27 is locked in operating position, with the contacts 58 and 59 engaged, the setting disc 21 cannot be reset by an unauthorized person.

The relay 53 has an armature which it will be understood, is normally attracted to close a pair of spring contacts 61, 62, the former being joined by a wire 63 to the wire 56 and the latter connected to the cam-operated contact 50 by the wire 64.

The input terminals of the primary and secondary windings of the transformer are connected by the conductor 52ᵇ with the pole of the battery opposite to that to which the relay contacts are connected by the wire 63. The secondary circuit is completed by the wire 65, which leads from wire 52ᵇ and is connected to the metal of the engine whereby the circuit may be completed, as will be understood, through one side of the spark plugs in the cylinders, the insulated terminals of the several plugs being each connected by separate conductors to the conducting segments of the distributor, in the usual manner, as shown.

The circuit for relay 53 may be traced from the positive pole of the source of power, or battery 55, through the closed contact of ignition switch 54ª, rod 16, spiral spring 35, pin 36, disc 21, contact spring 25, wire 60, contacts 59, 58, wire 57, through the winding of relay 53 to the negative pole of the battery. The relay being thus energized closes its contacts 61, 62 and the motor may be started. Each time a piston in one or another of the cylinders 1, 2, 3 or 4 approaches the top of its stroke, contacts 50, 50ª will be momentarily closed in the manner previously described to complete the circuit through the primary winding 52 of the transformer which may be traced as follows: battery 55, winding 52, contacts 50, 50ª, wire 64, contacts 62, 61, battery 55. Each such closure of the primary circuit will cause a pulse of current to flow through the secondary circuit which may be traced from the outer or grounded terminal of a spark plug and cylinder walls over conductors 65, 52ᵇ, through transformer winding 52ª, conducting ring 46, brush 41, one of the conducting segments 42, 43, 44 or 45, to the inner or insulated contact of the spark plug of the corresponding cylinder.

As the speed of the vehicle increases, drum 19 will rotate proportionally in a clockwise direction, until the limiting speed is reached, when pin 38 will rest lightly against the end of the spring 35. If the speed of the vehicle is now slightly increased, drum 19 in advancing will move the spring 38 to break the control circuit, thus permitting relay 53 to release its contacts. Relay 53 being slow to release is not affected by slight jars and consequently does not release its contacts until its circuit is opened positively by an attempt to maintain a speed above the limiting speed. When the circuit of the relay is positively interrupted, current ceases to flow in the circuit of the primary winding of transformer 52 and the engine automatically slackens its speed until the speed of the vehicle is less than the limit set, whereupon the spring 35 will be again permitted to move into contact with pin 36, thus reenergizing relay 53 and restoring the normal condition of the ignition circuit.

I claim:

1. In a speed controlling device for motor vehicles, the combination with an operating electric circuit of the motor of said vehicle of a rotatable member provided with indicating means and adapted to be set to correspond with a predetermined speed of the vehicle, a yieldable member disposed adjacent said settable member and forming with the latter a pair of switch contacts controlling said electric circuit, and a speed responsive member having a movement proportional to the speed of the vehicle and adapted to effect relative movement of said switch contacts at the predetermined speed.

2. In a speed controlling device for motor vehicles, the combination with an operating electric circuit of the motor of said vehicle of a rotatable member adapted to be set to correspond with a predetermined speed of the vehicle, a member rotatable with said settable member and yieldably disposed adjacent the latter to form therewith a pair of switch contacts controlling said circuit, and a speed responsive member having a movement proportional to the speed of the vehicle and adapted to effect relative movement of said switch contacts at the predetermined speed.

3. In a speed controlling device for motor vehicles, the combination with an operating electric circuit of the motor of said vehicle of a pair of relatively movable switch contacts controlling said circuit and also arranged for simultaneous rotary adjustment to correspond with a predetermined speed of the vehicle, and a speed responsive member having a movement proportional to the speed of the vehicle and arranged to effect relative movement of said switch contacts at the predetermined speed.

4. In a speed controlling device for motor vehicles, the combination with an operating electric circuit of the motor of said vehicle of a pair of relatively movable switch contacts controlling said circuit and also arranged for simultaneous rotary adjustment to correspond with a predetermined speed of the vehicle, a speed responsive member having a movement proportional to the speed of the vehicle, and a pin on said speed responsive member for effecting relative movement of said switch contacts at different positions of setting of the latter when the predetermined speed is reached.

5. In a speed controlling device for motor vehicles, the combination with an operating electric circuit of the motor of said vehicle of a speed responsive member having a movement proportional to the speed of the vehicle, a stop, a spring in yielding engagement with said stop to form a switch controlling said circuit, setting means for moving said stop and spring in unison along the path of movement of said speed responsive member to a position corresponding to a predetermined speed of the vehicle, and a part on said speed responsive member for separating said stop and spring at said predetermined speed.

6. In a speed controlling device for motor vehicles, the combination with an operating electric circuit of the motor of said vehicle of a rotatable member adapted to be set to correspond with a predetermined speed of the vehicle, a yieldable member disposed adjacent said settable member and forming with the latter a pair of switch contacts controlling said electric circuit, a speed responsive member having a movement proportional to the speed of the vehicle and adapted to effect relative movement of said switch contacts at the predetermined speed, and means comprising a lock for securing said settable member in adjusted position.

7. In a speed-control device for vehicles, the combination with an explosion motor having an ignition circuit, of two movable members arranged in axial alignment with each other, one adapted to be set for controlling the vehicle at a desired maximum speed, the other having a connection with a moving part of the vehicle adapted to operate it in one direction proportionally to the rate of travel of the vehicle, a spring located between said parts which is yieldingly held by the first-mentioned member and is capable of being moved by the second-mentioned member in the direction of its forward movement, the spring when so operated serving to render the ignition circuit inoperative.

8. In a speed-control device for vehicles, the combination with an explosion motor having an ignition circuit, of a speed-indicating member having a connection with a moving part of the vehicle adapted to move it in one direction proportionally to the rate of travel of the vehicle, a spring-operated member arranged to cooperate therewith having a normal tendency to move in the opposite direction, a setting device adjustable in both directions and engaging the member, limiting its normal movement and permitting it to rotate in the other direction under the influence of the speed indicating member, said member when so moved serving to render the ignition circuit ineffective.

9. In a speed-control device for vehicles, the combination with an explosion motor having an ignition circuit, and a speed indicator comprising a rotary element having a connection with a moving part of the vehicle adapted to move it in one direction proportionally to the rate of travel of the vehicle, a projection on said element, of a shaft arranged axially of the element, a coil spring thereon having an outer extremity normally tending to move in the opposite direction, and an adjustable setting member on the shaft and engaging the spring to yieldingly position its extremity relatively to said projection, and a circuit leading through the setting member and spring for rendering the ignition circuit ineffective when the spring is moved by the speed-indicator element.

10. In a speed-controlling device for motor vehicles, the combination with an internal combustion motor, an ignition circuit therefor which is normally open, a relay for closing it and a normally closed circuit for the relay, of a member having a connection with a moving part of the vehicle adapted to advance it in one direction proportionally to the rate of travel of the vehicle and serving to open the relay circuit when said member reaches a predetermined point.

11. In a speed-controlling device for motor vehicles, the combination with an internal combustion motor, an ignition circuit therefor having normally open contacts, a relay for closing them, and a circuit for the relay normally maintaining it energized, of a member having a connection with a moving part of the vehicle adapted to advance it in one direction proportionally to the rate of travel of the vehicle and operating to open the relay circuit when advanced to a predetermined point.

12. In a speed-controlling device for motor vehicles, the combination with an internal combustion motor, an ignition circuit therefor having normally open contacts and a relay for closing them, of a member having a connection with a moving part of the vehicle adapted to advance it in one direction proportionally to the rate of travel of the vehicle, normally closed contacts located in the path of movement of said member, and a circuit for the relay leading through said normally closed contacts.

13. In a speed-controlling device for motor vehicles, the combination with an internal combustion motor, an ignition circuit therefor which is normally open, and a slowly operating relay serving to normally close it, of a member having a connection with a moving part of the vehicle adapted to move it proportionally to the rate of travel of the vehicle, and a normally closed circuit for energizing the relay controlled by said member and opened by the latter when it reaches a predetermined point in its movement.

14. In a speed-controlling device for motor vehicles, the combination with an internal combustion motor, an ignition circuit therefor which is normally open, a slowly operating relay serving to normally close it, of a member having a connection with a moving part of the vehicle adapted to move it proportionally to the rate of travel of the vehicle, normally closed contacts adjustably mounted in the path of movement of the member and adapted to be opened when the latter reaches a predetermined point, and a circuit for energizing the relay leading through said contacts.

15. In a speed-controlling device for motor vehicles, the combination with a hydrocarbon engine, an ignition circuit therefor comprising primary and secondary windings and a source of electric energy, and a circuit for one of the windings having normally open contacts, of a relay for closing them, a circuit for said relay including normally closed adjustably mounted contacts, a member having a connection with a moving part of the vehicle adapted to move it in one direction from a zero position proportionally to the rate of travel of the vehicle and operating to open said adjustable contacts, and a device for moving said adjustable contacts bodily toward or from the zero position of said member.

16. In a speed-controlling device for motor vehicles, the combination with a hydrocarbon engine, an ignition circuit therefor comprising primary and secondary windings, a source of current and circuit connections between the latter and the windings, those of the primary winding having a pair of normally open contacts, of a slowly operating relay for closing them, a circuit connecting the relay with said source of current having a pair of normally closed contacts mounted for oscillatory adjustment, an oscillatory member having a connection with a moving part of the vehicle adapted to move it in one direction from an initial position proportionally to the rate of travel of the vehicle and serving to open said relay circuit contacts, and a member for rotatably adjusting the latter toward or from the initial position of said member.

17. In a speed-controlling device for motor vehicles, the combination with a hydrocarbon engine having an ignition circuit provided with a pair of normally open contacts, a relay for closing them and a pair of normally closed bodily adjustable contacts, of a member for adjusting them, a retaining device for the member and a pair of switch contacts, a locking member cooperating with the latter to close them and engaging the retaining device, a circuit for energizing the relay leading through both pairs of adjustable contacts and the switch contacts, and a member having a connection with a moving part of the vehicle adapted to move it proportionally to the rate of travel of the vehicle and arranged to open the normally closed contacts of the relay circuit when the speed of the vehicle exceeds a predetermined limit.

18. In a speed-controlling device for motor vehicles, the combination with a hydrocarbon engine having an ignition circuit provided with a pair of normally open contacts, a relay for closing them and a circuit for the latter comprising a pair of bodily adjustable normally closed contacts, of an instrument casing, a shaft therein supporting said contacts, a speed limit indicating device for adjusting the contacts operable exteriorly of the casing, a rotatable speed-indicating member also mounted in the casing and having a connection with a moving part of the vehicle adapted to move it proportionally to the rate of travel of the vehicle, and a projection on said member adapted to engage and separate said relay contacts.

19. In a speed controlling device for motor vehicles, the combination with an operating electric circuit of the motor of said vehicle, of a speed responsive member connected with a part driven by said motor and having a movement proportional to the speed of the vehicle, a pair of switch contacts for controlling said circuit adjustable relatively to said device and arranged for operation thereby at a predetermined speed, a second pair of switch contacts controlling said circuit, and means comprising a lock for controlling said second pair of contacts and for securing said first pair of contacts in adjusted position.

LELAND V. SLAIGHT.